L. D. PHILLIPS.
HOSE COUPLING.
No. 16,450.  Patented Jan. 20, 1857.
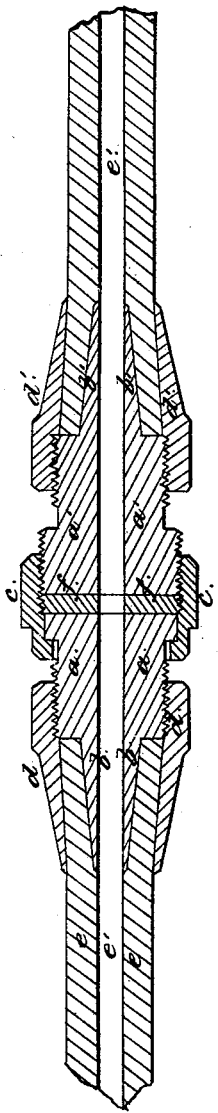
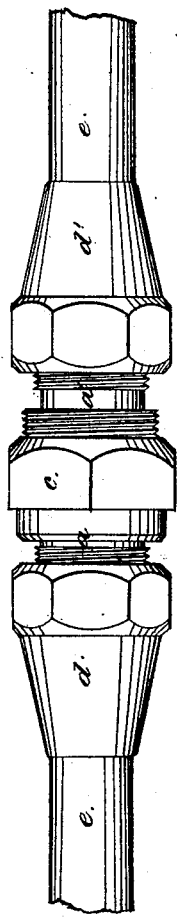
Witnesses:
M. Haskell
Wm. Armstrong
Inventor:
Loelner D. Phillips

UNITED STATES PATENT OFFICE.

L. D. PHILLIPS, OF CHICAGO, ILLINOIS.

HOSE-COUPLING.

Specification of Letters Patent No. 16,450, dated January 20, 1857.

*To all whom it may concern:*

Be it known that I, LODNER D. PHILLIPS, of Chicago, Cook county, State of Illinois, have invented a new and Improved Mode of Securing Couplings to Hose or Lead or Block-Tin Pipes; and I do hereby declare that the following is a full and exact description thereof, reference being had to the accompanying drawings and to the letters of reference marked thereon.

Figure 1, is a sectional and Fig. 2 is a perspective view of my improvement, similar letters referring to similar parts in each.

$a, a, a', a'$ are the two sections of a hose coupling, secured together by the nut $c$, and packed, to prevent leakage between them, by the leather or rubber ring $f, f$. The exterior end of each section is formed into a conical tube $b, b, b' b'$ of the same internal diameter as the hose or pipe to which the coupling is connected, and of a gradual slight taper on the outside.

$d, d, d' d'$ are conical sleeves, whose diameter at the mouth is the same as the exterior diameter of the hose or pipe, and their inside is tapered to correspond with the taper of the tubes $b, b, b' b'$. They have a thread cut on the inside of their lower end, which fits into the thread cut on the outside of the section $a, a, a' a'$.

$e, e'$ are two sections of hose or pipes to which the couplings are attached.

To secure my improved couplings to hose or pipes, the conical sleeves $d, d, d' d'$ are put over and on to the end of the hose or pipes—the point of the conical tubes $b, b, b' b'$ are inserted into the inside of the hose or pipes, and the sleeves secured down on to the sections until the hose or pipes are fastened securely and water tight. The different or separate lengths can then be coupled together the same as ordinarily done.

What I claim as my invention and desire to secure by Letters Patent is—

The combination of the sections $a, a'$ of the hose coupling (having conical tubes $b, b'$ on the exterior ends thereof) with the conical sleeves $d, d'$ as herein described, and for the purposes set forth.

LODNER D. PHILLIPS.

Witnesses:
M. HASKELL,
FRANCIS S. LOW.